United States Patent
Achenbach et al.

(10) Patent No.: US 7,148,306 B2
(45) Date of Patent: Dec. 12, 2006

(54) HIGHLY VISCOUS SILICONE MASSES COMPRISING ALKENYL-TERMINATED POLYDIORGANOSILOXANES WHICH MAY BE CROSS-LINKED BY ADDITION

(75) Inventors: Frank Achenbach, Simbach/Inn (DE); Christof Wörner, Burghausen (DE); Birgit Schacherbauer, Simback/Inn (DE); Norbet Egerter, Mehring (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 10/476,741

(22) PCT Filed: Apr. 4, 2002

(86) PCT No.: PCT/EP02/03759

§ 371 (c)(1),
(2), (4) Date: Nov. 3, 2003

(87) PCT Pub. No.: WO02/090437

PCT Pub. Date: Nov. 14, 2002

(65) Prior Publication Data

US 2004/0132947 A1    Jul. 8, 2004

(30) Foreign Application Priority Data

May 3, 2001  (DE) ................................. 101 21 513

(51) Int. Cl.
*C08G 77/20*  (2006.01)

(52) U.S. Cl. ............................. 528/32; 528/15; 528/31

(58) Field of Classification Search .................. 528/15, 528/32, 31
See application file for complete search history.

(56) References Cited

U.S. PATENT DOCUMENTS 3,884,866 A * 5/1975 Jeram et al. ................. 523/203

FOREIGN PATENT DOCUMENTS

| EP | 0 305 073 | | 3/1989 |
| EP | 0 695 787 A2 | | 2/1996 |
| EP | 0 994 159 A1 | | 4/2000 |
| EP | 1 006 147 A1 | | 6/2000 |
| EP | 1 077 226 A1 | | 2/2001 |
| GB | 2 196 638 | * | 5/1988 |

OTHER PUBLICATIONS

Derwent Abstract corres. to EP 1 077 226 [AN 2001-283482].
Derwent Abstract corres. to EP 1 006 147 [AN 2000-401775].
Derwent Abstract corres. to EP 0 994 159 [AN 2000-319924].

* cited by examiner

*Primary Examiner*—Kuo-Liang Peng
(74) *Attorney, Agent, or Firm*—Brooks Kushman P.C.

(57) ABSTRACT

Addition crosslinkable organopolysiloxane compositions which cure to organopolysiloxane elastomers of high elongation at break and high tear resistance contain a high viscosity, alkenyl-terminated, and substantially pendant alkenyl group-free organopolysiloxane, an organopolysiloxane having pendant alkenyl groups and optionally alkenyl-terminal groups, an Si—H functional crosslinker, and a hydrosilylation catalyst.

1 Claim, No Drawings

HIGHLY VISCOUS SILICONE MASSES COMPRISING ALKENYL-TERMINATED POLYDIORGANOSILOXANES WHICH MAY BE CROSS-LINKED BY ADDITION

BACKGROUND OF THE INVENTION

1. Field of the Invention

The invention relates to addition-crosslinkable silicone compositions and the silicone elastomers obtainable therefrom.

2. Description of the Related Art

It is known that addition of polydiorganosiloxanes having alkenyl groups in the chain to alkenyldiorganosiloxy-terminated polydiorganosiloxanes having a viscosity of up to 200,000 mPas can give addition-crosslinkable liquid silicone rubbers (LSR compositions) which, after crosslinking, produce silicone elastomers having improved mechanical properties. This applies particularly to the tear propagation resistance in accordance with ASTM D 624 B. One way of improving the mechanical properties, in particular the tear propagation resistance, is to add polydiorganosiloxanes having alkenyl groups in terminal positions and along the chain or low-viscosity alkenyldiorganosiloxy-terminated polydiorganosiloxanes to alkenyldiorganosiloxy-terminated polydiorganosiloxanes.

EP-A-305073 describes improvement of the mechanical properties, in particular the tear propagation resistance, by addition of a polydiorganosiloxane which bears vinyl groups both at the end of the chain and also in the chain and has a viscosity of 100,000 to 200,000 mPas to a vinyl-terminated polydiorganosioxane having a viscosity of from 20,000 to 200,000 mPas. This polymer combination makes it possible to obtain silicone elastomers having a tear propagation resistance of about 40 N/mm (ASTM D624) and an elongation at break of at most 580% at a hardness of about 50 Shore A.

EP-A-305073 describes improvement of the mechanical properties, in particular the tear propagation resistance, by addition of a polydiorganosiloxane which bears vinyl groups both at the end of the chain and also in the chain and has a viscosity of 100–200 000 mPas to a vinyl-terminated polydiorganosiloxane having a viscosity of from 20 000 to 200 000 mPas. This polymer combination makes it possible to obtain silicone elastomers having a tear propagation resistance of about 40 N/mm (ASTM D624) and an elongation at break of at most 580% at a hardness of about 50 Shore A.

EP-A-695787 describes improvement of the tear propagation resistance by means of a low molecular weight vinyl-terminated polydiorganosiloxane having a viscosity of from 1.0 to <50 mPas. However, the addition of such low-viscosity vinyl-terminated polydiorganosiloxanes results in a reduction in the elongation at break.

SUMMARY OF THE INVENTION

It is therefore an object of the invention to provide addition-crosslinkable silicone compositions which crosslink to form silicone elastomers having a high elongation at break and a high tear propagation resistance. This and other objects are achieved through the preparation of silicone elastomers from a high viscosity, alkenyl-terminated organopolysiloxane substantially free of pendant alkenyl groups, a polyorganosiloxane having from 0.5 to 20 mol percent of siloxy units having pendant alkenyl groups and optionally alkenyl siloxy termination, an Si—H functional crosslinker, and a hydrosilylation catalyst.

DETAILED DESCRIPTION OF THE INVENTION

The invention provides addition-crosslinkable silicone compositions comprising (A) 100 parts by weight of a diorganopolysiloxane having a viscosity determined at 25° C. of from 220,000 to 1,000,000 mPas and made up of 2 units of the formula (1)

$$[R_2R^1SiO_{1/2}] \quad (1),$$

units of the formula (2)

$$[R_2SiO_{2/2}] \quad (2), \text{ and}$$

from 0 to 0.1 mol % of units of the formula (3)

$$[RR^1SiO_{2/2}] \quad (3),$$

where, in the formulae (1) to (3),

R are identical or different monovalent, unsubstituted or halogen- or cyano-substituted, SiC-bonded $C_1$–$C_{18}$-hydrocarbon radicals which are free of aliphatic carbon-carbon multiple bonds and $R^1$ are identical or different monovalent, unsubstituted or halogen- or cyano-substituted $C_1$–$C_{10}$-alkenyl groups which are bound to the silicon either directly or via a divalent organic group, (B) from 2 to 100 parts by weight of a diorganopolysiloxane having a viscosity determined at 25° C. of from 500 to 1,000,000 mPas and made up of units of the formula (2) and from 0.5 to 20 mol % of units of the formula (3) and 2 units selected from among units of the formula (1) and units of the formula (4), $$[R_3SiO_{1/2}] \quad (4),$$

(C) an SiH-functional crosslinker whose composition corresponds to the average general formula (5)

$$H_aR^2{}_bSiO_{(4-a-b)/2} \quad (5)$$

where $R^2$ is defined as for R and a and b are nonnegative integers, with the provisos that 0.5<(a+b)<3.0 and 0<a<2 and that at least two hydrogen atoms bound to silicon are present per molecule and (D) a hydrosilylation catalyst.

Use of the high-viscosity vinyl-terminated polydiorganosiloxane (A) in combination with a polydiorganosiloxane (B) which bears vinyl groups in the chain and optionally also at the end of the chain gives LSR elastomers which have very high elongations at break and tear propagation resistances both in accordance with ASTM D 624 B and in accordance with DIN 53507. The addition-crosslinkable liquid silicone compositions can be processed by injection molding without problems despite the high viscosity of the vinyl-terminated polydiorganosiloxanes used.

The viscosity of the polydiorganosiloxane (B) is preferably not more than 50%, in particular not more than 20%, of the viscosity of the polydiorganosiloxane (A).

Examples of unsubstituted hydrocarbon radicals R are alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl, 4-ethylcyclohexyl and cycloheptyl radicals, norbornyl radicals and methylcyclohexyl radicals; aryl radicals such as the phenyl, biphenylyl, naphthyl, anthryl and phenanthryl radicals; alkaryl radicals such as the o-, m-, p-tolyl radicals, xylyl radicals and ethylphenyl radicals; aralkyl radicals such as the benzyl radical, the alpha- and β-phenylethyl radicals, and also the fluorenyl radical.

Examples of substituted hydrocarbon radicals as radical R are halogenated hydrocarbons such as the chloromethyl, 3-chloropropyl, 3-bromopropyl, 3,3,3-trifluoropropyl and 5,5,5,4,4,3,3-heptafluoropentyl radicals and also the chlorophenyl, dichlorophenyl and trifluorotolyl radicals.

The hydrocarbon radical R is preferably an unsubstituted or substituted $C_1$–$C_6$-alkyl radical or a phenyl radical, in particular a methyl or phenyl radical.

The alkenyl groups $R^1$ are able to undergo an addition reaction with the SiH-functional crosslinker (B). Use is usually made of alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, cyclohexenyl, preferably vinyl and allyl.

Divalent organic groups via which the alkenyl groups $R^1$ may be bound to silicon of the polymer chain comprise, for example, oxyalkylene units such as units of the general formula (6)

  (6)

where m is 0 or 1, in particular 0, n is from 1 to 4, in particular 1 or 2, and o is from 1 to 20, in particular from 1 to 5.

The oxyalkylene units of the formula (6) are bound at left to a silicon atom.

The diorganopolysiloxane (A) preferably has a viscosity determined at 25° C. of from 300,000 to 700,000 mPas.

The diorganopolysiloxane (A) preferably contains from 0 to 0.05% by weight of units of the formula (3), in particular no units of the formula (3).

The polydiorganosiloxane (B) can be terminated by units of the formula (1) and/or units of the formula (4). The polydiorganosiloxane (B) is preferably terminated by 2 units of the formula (1) or 2 units of the formula (4).

The diorganopolysiloxane (B) preferably has a viscosity determined at 25° C. of from 5,000 mPas to 100,000 mPas, in particular up to 40,000 mPas.

The addition-crosslinkable silicone composition preferably contains at least 3, in particular at least 5, parts by weight and not more than 60, in particular not more than 40, parts by weight of diorganopolysiloxane (B).

Preference is given to using a crosslinker (C) containing three or more SiH bonds per molecule. When a crosslinker having only two SiH bonds per molecule is used, it is advisable to use a diorganopolysiloxane (B) which has at least three alkenyl groups per molecule.

The hydrogen content of the crosslinker (C), which is based exclusively on the hydrogen atoms bound directly to silicon atoms, is preferably in the range from 0.002 to 1.7% by weight of hydrogen, preferably from 0.1 to 1.7% by weight of hydrogen.

The crosslinker (C) preferably contains at least three and not more than 600 silicon atoms per molecule. Preference is given to using crosslinkers (C) containing from 4 to 200 silicon atoms per molecule.

The structure of the crosslinker (C) can be linear, branched, cyclic or network-like.

Particularly preferred crosslinkers (C) are linear polyorganosiloxanes of the formula (7)

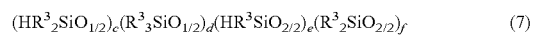  (7)

where $R^3$ is as defined for R and the nonnegative integers c, d, e and f obey the following relationships: (c+d)=2, (c+e)>2, 5<(e+f)<200 and 1<e/(e+f)<0.1.

The SiH-functional crosslinker (C) is preferably present in the crosslinkable silicone rubber composition in such an amount that the molar ratio of SiH groups to alkenyl groups is from 0.5 to 5, in particular from 1.0 to 3.0.

As hydrosilylation catalyst (D), it is possible to use all known catalysts which catalyze the hydrosilylation reactions occurring during crosslinking of addition-crosslinking silicone compositions. In particular, metals and their compounds, e.g. platinum, rhodium, palladium, ruthenium and iridium, preferably platinum, can be used as hydrosilylation catalysts (D). Preference is given to using platinum and platinum compounds. Particular preference is given to platinum compounds which are soluble in polyorganosiloxanes. Examples of soluble platinum compounds which can be used are the platinum-olefin complexes of the formulae $(PtCl_2.olefin)_2$ and $H(PtCl_3.olefin)$, where the olefins are preferably alkenes having from 2 to 8 carbon atoms, e.g. ethylene, propylene, isomers of butene and octene, or cycloalkenes having from 5 to 7 carbon atoms, e.g. cyclopentene, cyclohexene and cycloheptene. Further soluble platinum catalysts are the platinum-cyclopropane complex of the formula $(PtCl_2C_3H_6)_2$, the reaction products of hexachloro-platinic acid with alcohols, ethers and aldehydes or mixtures thereof or the reaction product of hexachloroplatinic acid with methylvinylcyclotetrasiloxane in the presence of sodium bicarbonate in ethanolic solution. Particular preference is given to complexes of platinum with vinylsiloxanes such as sym-divinyltetramethyl-disiloxane. The platinum compounds described in EP-A-1077226 and EP-A-994159 are also very useful.

The hydrosilylation catalyst (D) can be used in any desired form, for example in the form of microcapsules containing hydrosilylation catalyst or of organopolysiloxane particles as described in EP-A-1006147.

The content of hydrosilylation catalysts (D) is selected so that the addition-crosslinkable silicone composition has a Pt content of 0.1–200 ppm, preferably 0.5–40 ppm.

The addition-crosslinkable silicone composition can additionally contain a diorganopolysiloxane (E) having a viscosity determined at 25° C. of from 1,000 to 200,000 mpas, in particular from 5,000 to 100,000 mpas, and made up of 2 units of the formula (1), units of the formula (2) and from 0 to 0.01 mol % of units of the formula (3). Preference is given to not more than 70 parts by weight, in particular not more than 30 parts by weight, of diorganopolysiloxane (E) being present in the addition-crosslinkable silicone composition. The diorganopolysiloxane (E) preferably contains from 0 to 0.05% by weight of units of the formula (3), in particular no units of the formula (3).

The mechanical strength of the vulcanized silicone rubber is increased when the addition-crosslinkable silicone compositions contain actively reinforcing fillers as constituent (F). Actively reinforcing fillers (F) used are, in particular, precipitated and in particular pyrogenic silicas, and also mixtures thereof. The specific surface area of these actively reinforcing fillers should be at least 50 m$^2$/g or preferably be in the range from 200 to 400 m$^2$/g as determined by the BET method. Such actively reinforcing fillers are very well known materials in the field of silicone rubbers. The amount of actively reinforcing filler (F) present in the addition-crosslinkable silicone compositions is preferably in the range from 5 to 60% by weight, in particular from 10 to 40% by weight.

The addition-crosslinkable silicone compositions can, if desired, contain further additives in a proportion of up to 70% by weight, preferably from 0.0001 to 40% by weight, as constituent (G). These additives can be, for example, inactive (nonreinforcing) fillers, resin-like polyorganosiloxanes which are different from the diorganopolysiloxanes (A), (B) and (E), dispersants, solvents, adhesion promoters, pigments, dyes, plasticizers, organic polymers, heat stabilizers, etc. They include additives such as quartz flour, diatomaceous earth, clays, chalk, lithopone, carbon black, graphite, metal oxides, metal carbonates and metal sulfates, metal salts of carboxylic acids, metal dusts, fibers such as glass fibers, polymer fibers, polymer powders, dyes, pigments, etc. Furthermore, constituents having a thixotropic effect, e.g. finely divided silica or other commercial thixotropic additives, can be present as constituent (G). In addition, siloxanes of the formula HSi(CH$_3$)$_2$-[O—Si(CH$_3$)$_2$]$_x$—H, where x is from 1 to 1 000, may be present as chain extenders.

Further additives (G) which may also be present are additives which have a targeted effect on the processing time, crosslinking start temperature and crosslinking rate of the addition-crosslinking compositions. These inhibitors and stabilizers are very well known in the field of addition-crosslinking compositions.

It is also possible to add additives which improve the compressive set. Hollow bodies can also be added. It is also possible to add blowing agents to produce foams. Polydiorganosiloxanes which are not functionalized by vinyl groups can also be added.

The compounding of the addition-crosslinkable silicone compositions is carried out by mixing the above-described components in any order. The addition-crosslinkable silicone compositions are preferably crosslinked by heating, preferably at from 30 to 250° C., more preferably at at least 50° C., in particular at at least 100° C., preferably at not more than 200° C., in particular at not more than 180° C.

The invention also provides the silicone elastomers which are obtainable by crosslinking the addition-crosslinkable silicone compositions.

In the following examples, unless indicated otherwise,
a) all pressures are 0.10 MPa (abs.);
b) all temperatures are 20° C.

EXAMPLES

Comparative Example C1 (not according to the invention)

Preparation of the base composition:

790 parts by mass of a vinyldimethylsiloxy-terminated polydimethylsiloxane having a viscosity of 100,000 mPas (25° C.) were placed in a laboratory kneader, heated to 150° C. and admixed with 460 parts by mass of a hydrophobic pyrogenic silica having a specific surface area determined by the BET method of 300 m$^2$/g and a carbon content of 3.9% by weight. This gave a highly viscous mass which was subsequently diluted with 350 parts by mass of a vinyldimethylsiloxy-terminated polydimethylsiloxane having a viscosity of 100,000 mPas (25° C.). Volatile constituents were removed by kneading under reduced pressure (10 mbar) at 150° C. for one hour.

560 g of this base composition were mixed on a roll mill at a temperature of 25° C. with 0.50 g of ethynylcyclohexanol, 14.0 g of a copolymer comprising dimethylsiloxy, methylhydrogensiloxy and trimethylsiloxy units and having a viscosity of 100 mPas at 25° C. and an SiH content of 0.48% and also 0.48 g of a solution containing a platinum-sym-divinyltetramethyldisiloxane complex and having a Pt content of 1% by weight. The Pt content of the silicone composition was 8 ppm.

The silicone compositions prepared in this way were subsequently crosslinked for 10 minutes at a temperature of 170° C. in a hydraulic press. After removal from the press, the about 2 or 6 mm thick silicone elastomer films were heated at 200° C. in a convection oven for 4 hours.

Comparative Example C2 (not according to the invention)

Preparation of the base composition:

670 parts by mass of a vinyldimethylsiloxy-terminated polydimethylsiloxane having a viscosity of 100,000 mPas (25° C.) and 120 parts by mass of a trimethylsiloxy-terminated polydimethylsiloxane having a viscosity of 20,000 mPas (25°C.) and having 2.1 mol % of vinylmethyl-siloxy units in the chain were placed in a laboratory kneader, heated to 150° C. and admixed with 460 parts by mass of a hydrophobic pyrogenic silica having a specific surface area determined by the BET method of 300 m$^2$/g and a carbon content of 3.9% by weight. This gave a highly viscous mass which was subsequently diluted with 350 parts by mass of a vinyldimethylsiloxy-terminated polydimethylsiloxane having a viscosity of 100,000 mPas (25° C.). Volatile constituents were removed by kneading under reduced pressure (10 mbar) at 150° C. for one hour.

Crosslinking of the silicone composition was carried out as described in Example 1.

Comparative Example C3 (not according to the invention)

The procedure described in Comparative Example C1 was followed, but a vinyldimethylsiloxy-terminated polydimethylsiloxane having a viscosity of 500,000 mPas (25° C.) was used in place of the vinyldimethylsiloxy-terminated polydimethylsiloxane having a viscosity of 100,000 mPas (25° C.) which was used in Example 1. The other components of the silicone composition and the further processing remained unchanged.

Example 4

The procedure described in Comparative Example C2 was followed, but a vinyldimethylsiloxy-terminated polydimethylsiloxane having a viscosity of 500,000 mPas (25° C.) was used in place of the vinyldimethylsiloxy-terminated polydimethylsiloxane having a viscosity of 100,000 mPas (25° C.) which was used in Example 2. The other components of the silicone composition and the further processing remained unchanged.

Example 5

The procedure described in Comparative Example C4 was followed, but the trimethylsiloxy-terminated polydimethylsiloxane having a viscosity of 20,000 mPas (25° C.) and having 2.1 mol % of vinylmethylsiloxy units in the chain which was used in Example 4 was replaced by a vinyldimethylsiloxy-terminated polydimethylsiloxane of the same viscosity and identical vinylmethylsiloxy content. The other components of the silicone composition and the further processing remained unchanged.

Example 6

The procedure described in Comparative Example 4 was followed, but 20% by weight of the vinyldimethylsiloxy-terminated polydimethylsiloxane having a viscosity of 500,000 mPas (25° C.) which was used in Example 4 were replaced by a vinyldimethylsiloxy-terminated polydimethylsiloxane having a viscosity of 20,000 mpas (25° C.). The other components of the silicone composition and the further processing remained unchanged.

which has a lower viscosity and has vinyl groups in the chain gives LSR elastomers which have very high elongations at break and tear propagation resistances both in accordance with ASTM D 624 B and in accordance with DIN 53507.

Example 7

The procedure described in Comparative Example 4 was followed, but 11.2 g of a copolymer comprising dimethylsiloxy, methylhydrogensiloxy and trimethylsiloxy units and having a viscosity of 30 mPas at 25° C. and an SiH content of 0.37% were used in place of the SiH crosslinker described in Example 1.

Example 8

The procedure described in Comparative Example 4 was followed, but a hydrophobic pyrogenic silica which had

TABLE 1

Influence of the viscosity of the vinyldimethylsiloxy-terminated polydimethylsiloxane used and the addition of polydiorganosiloxanes having alkenyl groups along the chain on the mechanical properties of LSR elastomers

|  | Viscosity of the uncrosslinked LSR composition [mPas] | Hardness [Shore A] | Tear propagation resistance (ASTM D624) [N/mm] | Tear propagation resistance (DIN 53507) [N/mm] | Ultimate tensile strength [N/mm$^2$] | Elongation at break [%] |
|---|---|---|---|---|---|---|
| Comparative Example C1 | 1,400,000 | 43 | 28 | 12.5 | 9.8 | 580 |
| Comparative Example C2 | 1,300,000 | 49 | 45 | 12.0 | 10.1 | 550 |
| Comparative Example C3 | 2,800,000 | 42 | 32 | 17.0 | 10.2 | 740 |
| Example 4 | 2,500,000 | 48 | 47 | 19.1 | 10.5 | 720 |
| Example 5 | 2,500,000 | 49 | 46 | 18.5 | 10.2 | 730 |
| Example 6 | 2,000,000 | 49 | 47 | 18.1 | 10.2 | 690 |

It can be seen from Table 1 that use of a high-viscosity vinyl-terminated polydiorganosiloxane having a viscosity of 500,000 mpas in combination with a polydiorganosiloxane been partially functionalized by vinyl groups was used in place of the hydrophobic pyrogenic silica used in Example 1.

TABLE 2

Influence of various crosslinkers and pyrogenic silicas having different vinyl contents on the mechanical properties of LSR elastomers

|  | Viscosity of the uncrosslinked LSR composition [mPas] | Hardness [Shore A] | Tear propagation resistance (ASTM D624) [N/mm] | Tear propagation resistance (DIN 53507) [N/mm] | Ultimate tensile strength [N/mm$^2$] | Elongation at break [%] |
|---|---|---|---|---|---|---|
| Example 4 | 2,500,000 | 48 | 47 | 19.1 | 10.5 | 720 |
| Example 7 | 2,300,000 | 41 | 43 | 19.0 | 10.2 | 810 |
| Example 8 | 2,400,000 | 60 | 51 | 17.0 | 9.8 | 590 |

It can be seen from Table 2 that use of a high-viscosity vinyl-terminated polydiorganosiloxane having a viscosity of 500,000 mPas in combination with a polydiorganosiloxane which has a lower viscosity and has vinyl groups in the chain gives LSR elastomers which have very high elongations at break and tear propagation resistances both in accordance with ASTM D 624 B and in accordance with DIN 53507 over a wide hardness range.

The characterization of the silicone elastomer properties in Examples 1–8 was carried out in accordance with DIN 53505 (Shore A), DIN 53504-S1 (ultimate tensile strength and elongation at break), ASTM D 624 B and DIN 53507 (tear propagation resistance). The viscosity was measured at a shear rate of 0.9 s$^{-1}$.

The invention claimed is:

1. An addition-crosslinkable, injection moldable silicone composition comprising:

an ethylenically unsaturated organopolysiloxane component comprising (A) and (B):

(A) 100 parts by weight of an α,ω-terminal alkenyl-functional diorganopolysiloxane having a viscosity determined at 25° C. of from 300,000 to 700,000 mPas and comprising 2 units of the formula (1)

$$[R_2R^1SiO_{1/2}] \quad (1),$$

units of the formula (2)

$$[R_2SiO_{2/2}] \quad (2),$$ and from 0 to 0.1 mol % of units of the formula (3)

$$[RR^1SiO_{2/2}] \quad (3),$$

where, in the formulae (1) to (3),

R are identical or different monovalent, unsubstituted or halogen- or cyano-substituted, SiC-bonded $C_1$–$C_{18}$-hydrocarbon radicals which are free of aliphatic carbon-carbon multiple bonds and $R^1$ are identical or different monovalent, unsubstituted or halogen- or cyano-substituted $C_1$–$C_{10}$-alkenyl groups which are bound to the silicon either directly or via a divalent organic group, (B) from 2 to 100 parts by weight of a diorganopolysiloxane containing alkenyl-on-chain vinyl units and having a viscosity determined at 25° C. of 20,000 mPas to 40,000 mPas, and comprising units of the formula (2), from 0.5 to 20 mol % of units of the formula (3), and 2 units of the formula (1) and/or units of the formula (4), $$[R_3SiO_{1/2}] \quad (4),$$

(C) an SiH-functional crosslinker whose composition corresponds to the average formula (5), $$H_aR^2{}_bSiO_{(4-a-b)/2} \quad (5),$$

where $R^2$ is defined as for R and a and b are nonnegative integers, with the provisos that 0.5<(a+b)<3.0 and 0<a<2 and that at least two hydrogen atoms bound to silicon are present per molecule, and (D) a hydrosilylation catalyst.

* * * * *